(12) United States Patent
Shibayama et al.

(10) Patent No.: US 9,719,153 B2
(45) Date of Patent: Aug. 1, 2017

(54) METHOD FOR SHORTENING OPERATION SHUTDOWN TIME OF HIGH PRESSURE ACID LEACH EQUIPMENT IN A HYDROMETALLURGICAL PROCESS

(71) Applicant: SUMITOMO METAL MINING CO., LTD., Tokyo (JP)

(72) Inventors: Keisuke Shibayama, Tokyo (JP); Osamu Nakai, Tokyo (JP); Yoshitomo Ozaki, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 599 days.

(21) Appl. No.: 14/063,403

(22) Filed: Oct. 25, 2013

(65) Prior Publication Data

US 2014/0048987 A1  Feb. 20, 2014

Related U.S. Application Data

(63) Continuation of application No. 12/458,718, filed on Jul. 21, 2009.

(30) Foreign Application Priority Data

Jul. 31, 2008  (JP) ................................. 2008-197208

(51) Int. Cl.
  *C22B 3/00*   (2006.01)
  *C01G 53/11*  (2006.01)
  *C22B 15/00*  (2006.01)

(52) U.S. Cl.
  CPC ............ *C22B 23/043* (2013.01); *C01G 53/11* (2013.01); *C22B 23/0407* (2013.01); *C22B 23/0453* (2013.01); *C22B 23/0461* (2013.01); *C22B 15/0093* (2013.01); *Y02P 10/236* (2015.11)

(58) Field of Classification Search
None
See application file for complete search history.

(56) References Cited

U.S. PATENT DOCUMENTS

| | | | |
|---|---|---|---|
| 4,953,607 A | 9/1990 | Erkki et al. | |
| 5,535,992 A | 7/1996 | Krause | |
| 2004/0131522 A1 | 7/2004 | Johnson | |
| 2005/0265910 A1 | 12/2005 | Kobayashi et al. | |

FOREIGN PATENT DOCUMENTS

| | | |
|---|---|---|
| AU | 2007216761 A1 | 4/2008 |
| JP | 2005-350766 A | 12/2005 |

*Primary Examiner* — Melissa Swain
(74) *Attorney, Agent, or Firm* — Locke Lord LLP; James E. Armstrong, IV; Nicholas J. DiCeglie, Jr.

(57) ABSTRACT

This invention provides a method for shortening operation shutdown time of high pressure acid leach equipment in a hydrometallurgical process, wherein the high pressure acid leach equipment comprises (i) means to transfer an ore slurry into the high pressure acid leach equipment;(ii) means to increase temperature and pressure of an ore slurry before leaching; (iii) means to add sulfuric acid into the high pressure acid leach equipment and to leach the ore slurry to obtain a leached slurry at high temperature under high pressure; (iv) means to adjust the pressure of the leached slurry; and (v) means to discharge the leached from the high pressure acid leach equipment; wherein, upon operation shutdown of the high pressure acid leach equipment, the leached slurry is subjected to self-circulation inside the high pressure acid leach equipment.

7 Claims, 1 Drawing Sheet

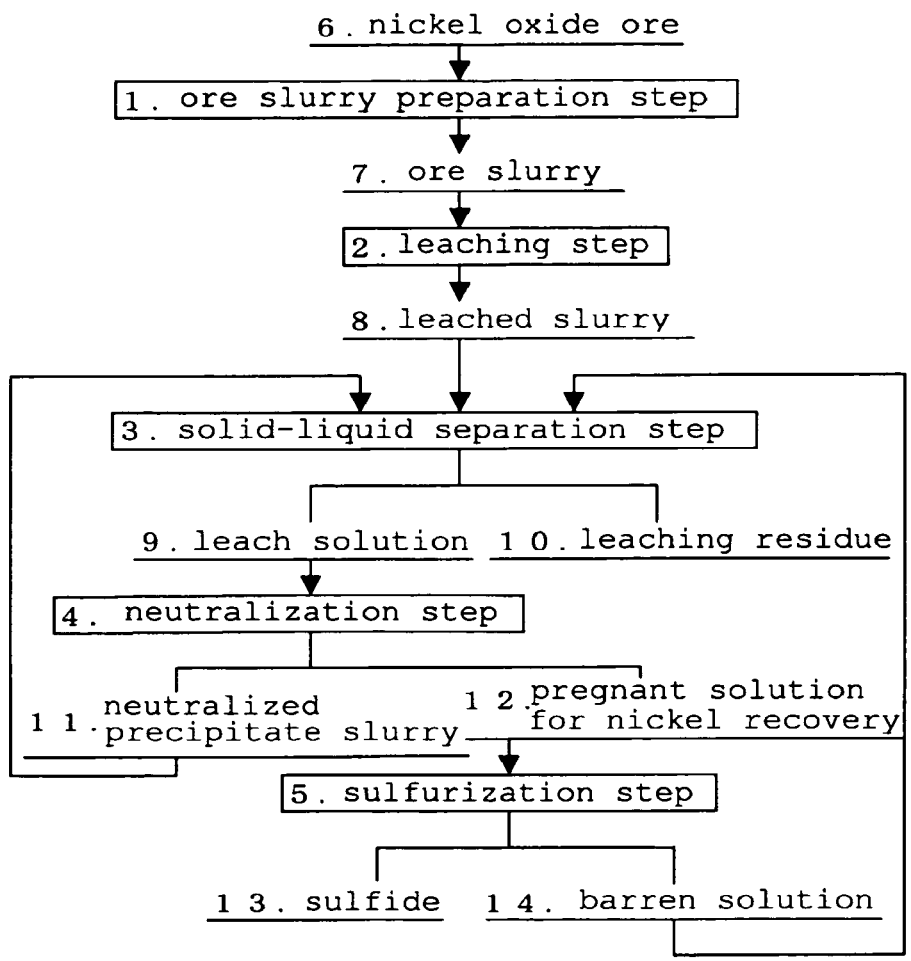

METHOD FOR SHORTENING OPERATION SHUTDOWN TIME OF HIGH PRESSURE ACID LEACH EQUIPMENT IN A HYDROMETALLURGICAL PROCESS

CROSS-REFERENCE TO RELATED APPLICATIONS/PATENTS & INCORPORATION BY REFERENCE

This application is a continuation of U.S. patent application Ser. No. 12/458,718, filed on Jul. 21, 2009, which application claims the right of priority under 35 U.S.C. §119 based on Japanese Patent Application Serial No. 2008-197208, filed Jul. 21, 2008, the contents of each of which are incorporated herein by reference in their entireties.

Any and all references cited in the text of this patent application, including any U.S. or foreign patents or published patent applications, International patent applications, as well as, any non-patent literature reference, including any manufacturer's instructions, are hereby expressly incorporated by reference.

BACKGROUND OF THE INVENTION

Field of the Invention

The present invention relates to a hydrometallurgical Process for a nickel oxide ore, in more detail, in a hydrometallurgical Process for a nickel oxide ore using a High Pressure Acid Leach including a preparation step of ore slurry for making a slurry of a nickel oxide ore, a leaching step for obtaining leached slurry by transferring the relevant ore slurry to a High Pressure Acid Leach equipment for leaching nickel and cobalt, and a solid-liquid separation step of the relevant leached slurry, the present invention relates to a hydrometallurgical Process for a nickel oxide ore, which is capable of preventing inevitable operation shutdown of the above leaching step and maintaining high operation efficiency as a whole process basis, in a trouble of the steps other than the above leaching step.

Description of the Prior Art

A High Pressure Acid Leach using sulfuric acid has been noticed in recent years, as a wet-smelting process recovering Nickel and Cobalt from a nickel oxide ore, which contains an iron as a main component and 1 to 2% by weight of Nickel. This method is composed of consistent wet process steps without pyrometallurgical treatment steps such as drying and roasting steps, unlike the conventional general smelting method of nickel oxide ore, thus providing advantage in view of energy and cost saving. That is, the above High Pressure Acid Leach is capable of leaching nickel and cobalt selectively relative to iron, by controlling the redox potential and temperature of a leach solution inside a pressurized leaching reactor in the leaching step, and by fixing the iron, which is a main impurity, onto a leaching residue as a form of hematite ($Fe_2O_3$), therefore it has very big merit.

The above High Pressure Acid Leach is composed of a step for preparing an ore slurry, for example, by making slurry of a nickel oxide ore (ore slurry preparation step); a step for obtaining leached slurry, by adding the sulfuric acid to the above ore slurry, leaching at a high temperature of 220 to 280° C. under high pressure, using an autoclave (leaching step); a step for solid-liquid separation of a leaching residue and a leach solution containing nickel and cobalt (solid-liquid separation step); a step for neutralization separation of impurity elements such as iron, by adjusting the pH of the leach solution containing the impurity elements along with nickel and cobalt at 3 to 4 (a neutralization step); and a step for recovering of a mixed sulfide of nickel/cobalt, by supplying the hydrogen sulfide gas into the leach solution after neutralization separation (a sulfurization step) (for example, refer to Patent Literature 1).

Here, in the above ore slurry preparation step, the ore slurry, which is adjusted to predetermined particle size, is obtained by crushing and sieving of a nickel oxide ore with a wet process. In addition, in the above leaching step, firstly the ore slurry is subjected to passing through inside a multistage heater to increase temperature and pressure stepwise. Subsequently, in the autoclave, sulfuric acid is added to leach a part of the impurities, along with nickel and cobalt, into a solution under high pressure at high temperature formed with high-pressure steam. Lastly, the leach solution is subjected to passing through the multistage flash tank to decrease temperature and pressure stepwise.

It should be noted that, in the above leaching step, operation is performed at a high temperature of usually 240 to 260° C., under high pressure, by using a pressure vessel (autoclave) or the like, made of a very expensive material such as, for example, titanium, ceramic and stainless steel, therefore in the High Pressure Acid Leach equipment to be used in the operation, sufficient management based on standards is indispensable, for securing safety and maintenance of the equipment, in shutdown for scheduled inspection, repair or the like, or also start-up. For example, it is necessary to manage temperature increasing rate in start-up and temperature decreasing rate in shutdown at a nearly constant rate of equal to or lower than about 10 to 15° C./h, and not to exceed 25° C./h, even at the maximal rate.

For example, in start-up of the above High Pressure Acid Leach equipment, firstly, temperature of a heater, an autoclave and a flash tank, which compose the equipment, is increased in a state that each of them is separated individually. Still more, the inside of the autoclave is charged with water in advance, and temperature thereof is increased under an operation state of an attached apparatus such as a stirrer, seal thereof.

Next, at the timing when temperature of each apparatus is increased up to about 150 to 180° C., the heater, the autoclave and the flash tank are connected as apparatuses. It should be noted that, at this stage, because temperature is still low and suitable operation condition has not been attained, the ore slurry as a raw material cannot be supplied. Accordingly, industrial water is supplied to the heater instead of the ore slurry to be supplied in normal operation. Industrial water supplied here is sent from the flash tank to the subsequent preliminarily neutralizing step and the solid-liquid separation step, via the autoclave, and finally becomes discharged water.

After that, at the timing when temperature of each apparatus reached about 220° C., supply to the heater is switched from industrial water to the ore slurry. Still more, at the timing when the temperature reached about 230° C., sulfuric acid is added to the inside of the autoclave, to start leaching of nickel or cobalt from the ore slurry, and at this timing, start-up is completed, and hereafter normal operation is started.

It should be noted here that advantage of increasing temperature in a state that each of the heater, the autoclave and the flash tank is separated, is reduction of use amount of industrial water and amount of discharged water from the process. That is, in the case where they are connected at a temperature of below 150° C., for example, use amount of industrial water to be supplied instead of the ore slurry increases, resulting in generation of a large amount of discharged water. In this sense, it is desirable that they are connected at a temperature side as higher as possible near 180° C. However, in the case where they are connected at a temperature of over 180° C., for example, at equal to or higher than 200° C., difference between vapor pressure in the autoclave and vapor pressure in the flash tank becomes large, and thus pressure-like impact generates onto the flash tank in connection, and in the worst case, a valve or inner-lining brick of the flash tank are damaged.

On the other hand, on temperature decreasing in shutdown of the above High Pressure Acid Leach equipment, any of the methods may be selected from a method for cooling by supplying industrial water instead of the ore slurry, while these apparatuses are connected; or a method for cooling individually, by separation of each of the apparatuses.

In the former case, due to use of industrial water, discharged water generates in that amount, however, cooling rate is fast and thus temperature can be decreased in a shorter time. Here, temperature decreasing rate is generally 10 to 15° C./h. In addition, in the latter case, although there is no discharged water generation, cooling rate is slow and thus a longer time is required in temperature decrease. Here, temperature decreasing rate is generally 5 to 10° C./h. It should be noted here that ratio of both temperature decreasing rates is generally 3 times.

It should be noted here that the situation leading to inevitable shutdown of the above High Pressure Acid Leach equipment includes, other than shutdown accompanied with the above scheduled inspection and repair, the generation of emergency such as a process trouble, which could give tremendously bad influence on safety or environment; or the case of generation of a relatively small scale trouble such as off specifications of intermediate products in the ore slurry preparation step of a prior step of the leaching step, or the neutralization step or the sulfurization step and the like of the subsequent steps. In the case where such a trouble is generated, it was general that, in all of the cases other than the above emergency situation, the system is shutdown safely by gradually decreasing temperature and pressure, by taking importance on maintenance of the equipment, similarly as in shutdown accompanied with the above scheduled inspection, repair or the like.

However, in a trouble of the steps other than the above leaching step using the High Pressure Acid Leach equipment, the above relatively small scale troubles generate in many cases, and in such troubles, because of no failure in the High Pressure Acid Leach equipment itself, there was required that, by maintaining operation of the High Pressure Acid Leach equipment as longer as possible, operation shutdown time shall be shortened, and decrease in operation efficiency shall be suppressed, as well as frequency of shutdown and start-up of the equipment shall be decreased. As a countermeasure for this, there has been performed a method for maintaining operation, by using buffer tanks installed before and after the High Pressure Acid Leach equipment, to temporarily store a solution inside the buffer tanks, on the contrary, a method for maintaining operation by using the solution inside the buffer tanks, or a method for preventing shutdown of the High Pressure Acid Leach equipment, by adjustment of flow rate of slurry to be supplied into the autoclave. However, even by such countermeasures, shutdown of the leaching step was necessary, in the case of over limitation.

Under the above circumstance, it has been required, a trouble of the steps other than the above leaching step using the High Pressure Acid Leach equipment, to prevent operation shutdown of the leaching step, which is configured by the High Pressure Acid Leach equipment, and to maintain high operation efficiency as a whole process basis.
[Patent Literature 1] JP-A-2005-350766 (page 1 and page 2)

SUMMARY OF THE INVENTION

In view of the above conventional technological problems, it is an object of the present invention to provide a hydrometallurgical Process for a nickel oxide ore, which is capable of preventing inevitable operation shutdown of the above leaching step, and maintaining high operation efficiency as a whole process basis, in a hydrometallurgical Process for a nickel oxide ore, using the High Pressure Acid Leach including: a preparation step of ore slurry for making the slurry of a nickel oxide ore; a leaching step for obtaining leached slurry by transferring of the ore slurry to a High Pressure Acid Leach equipment, for leaching nickel and cobalt; and a solid-liquid separation step of the leached slurry, and in a trouble of the steps other than the above leaching step.

The present inventors have found that inevitable operation shutdown of the above leaching step can be prevented, and high operation efficiency can be maintained as a whole process basis, by self-circulation of the above reached slurry, inside the High Pressure Acid Leach equipment, under specific conditions, in a hydrometallurgical Process for a nickel oxide ore, using the High Pressure Acid Leach including: a step for preparing an ore slurry by making a slurry of a nickel oxide ore; a leaching step for obtaining leached slurry by transferring of the ore slurry to a High Pressure Acid Leach equipment, equipped with the following means (a) to (c), for leaching nickel and cobalt; and a solid-liquid separation step of the leached slurry, and in a trouble of the steps other than the above leaching step, and have thus completed the present invention:
means (a) to preliminarily increase temperature and pressure of the ore slurry;
means (b) to form the leached slurry, by the addition of sulfuric acid to the ore slurry with preliminarily increased temperature and pressure, and leaching under blow of high-pressure steam and, if necessary, high-pressure air;
means (c) to adjust a pressurized state of the leached slurry formed.

That is, according to a first aspect of the present invention, there is provided a hydrometallurgical Process for a nickel oxide ore, using a High Pressure Acid Leach including: a preparation step of ore slurry for making a slurry of a nickel oxide ore; a leaching step for obtaining leached slurry by transferring of the ore slurry to a High Pressure Acid Leach equipment equipped with the following means (a) to (c), for leaching nickel and cobalt; and a solid-liquid separation step of the leached slurry; characterized in that, in a trouble of the steps other than the above leaching step,
the leached slurry, discharged from the means (c), which is used in the above High Pressure Acid Leach equipment, is subjected to self-circulation inside the High Pressure Acid Leach equipment, by shutdown of transfer to the above solid-liquid separation step, and transferred to the means (a), which is used in the above High Pressure Acid Leach equipment, as well as by shutdown of receiving the above ore slurry and the addition of sulfuric acid, in the above leaching step:
means (a) to preliminarily increase temperature and pressure of the ore slurry;
means (b) to form the leached slurry, by the addition of sulfuric acid to the ore slurry with preliminarily increased temperature and pressure, and leaching under blow of high-pressure steam and high-pressure air;

means (c) to adjust a pressurized state of the leached slurry formed.

In addition, according to a second aspect of the present invention, there is provided the hydrometallurgical Process for a nickel oxide ore in the first aspect of the invention, characterized in that, in self-circulation of the above leached slurry inside the High Pressure Acid Leach equipment, pH of the leached slurry is adjusted at 3.0 to 5.0.

In addition, according to a third aspect of the present invention, there is provided the hydrometallurgical Process for a nickel oxide ore in the first or the second aspect of the invention, characterized in that, in self-circulation of the above leached slurry inside the High Pressure Acid Leach equipment, temperature of the means (b), which is used in the High Pressure Acid Leach equipment, is 200 to 260° C.

In addition, according to a fourth aspect of the present invention, there is provided the hydrometallurgical Process for a nickel oxide ore in any one of the first to the third aspects of the invention, characterized in that, each of the above means (a) to (c) uses the following apparatus:

means of (a): a multistage heater for increasing temperature and pressure of the ore slurry stepwise, means of (b): an autoclave for leaching the ore slurry at high temperature under high pressure, and forming the leached slurry with high temperature and high pressure, and means of (c): a multistage flash tank for decreasing temperature and pressure of the leached slurry stepwise.

In addition, according to a fifth aspect of the present invention, there is provided the hydrometallurgical Process for a nickel oxide ore in any one of the first to the fourth aspects of the invention, characterized in that, in the trouble of the steps other than the above leaching step, estimated shutdown time of the leaching step accompanying therewith is within a time required in the case of shutdown of the High Pressure Acid Leach equipment, separation of each apparatus and decreasing of temperature, and subsequent increasing of temperature again.

In addition, according to a sixth aspect of the present invention, there is provided the hydrometallurgical Process for a nickel oxide ore in the fifth aspect of the invention, characterized in that the above estimated shutdown time is within 12 hours.

The hydrometallurgical Process for a nickel oxide ore of the present invention, in a hydrometallurgical Process for a nickel oxide ore using the above High Pressure Acid Leach, and in a trouble of the steps other than the above leaching step, is capable of preventing inevitable operation shutdown of the above leaching step, by self-circulation of the leached slurry inside the High Pressure Acid Leach equipment by shutdown of receiving of the above ore slurry and the addition of sulfuric acid, in the above leaching step, as well as by shutdown of transfer of the leached slurry discharged from the means of (c), which is used in the above High Pressure Acid Leach equipment, to the above solid-liquid separation step, and transferring to the means of (a), which is used in the above High Pressure Acid Leach equipment, and is capable of maintaining operation, by restart operation soon, if necessary, as well as by no generation of discharged water due to no use of industrial water, and still more by preventing corrosion troubles of apparatuses such as a heater or pump of the High Pressure Acid Leach equipment, under suitable control of pH of the leached slurry to be circulated, and thus industrial value thereof is extremely high.

BRIEF DESCRIPTION OF THE DRAWING

FIG. 1 is a process chart representing an example of one embodiment of a hydrometallurgical Process for a nickel oxide ore, in a normal state, according to a High Pressure Acid Leach.

NOTATION 1 ore slurry preparation step
2 leaching step
3 solid-liquid separation step
4 neutralization step
5 sulfurization step
6 nickel oxide ore
7 ore slurry
8 leached slurry
9 leach solution
10 leaching residue
11 neutralized precipitate slurry
12 pregnant solution for nickel recovery
13 sulfide
14 barren solution

DETAILED DESCRIPTION OF THE INVENTION

Explanation will be given below in detail on the hydrometallurgical Process for a nickel oxide ore, of the present invention.

The hydrometallurgical Process for a nickel oxide ore of the present invention is a hydrometallurgical Process for a nickel oxide ore using a High Pressure Acid Leach including:

a preparation step of ore slurry for making a slurry of a nickel oxide ore; a leaching step for obtaining leached slurry by transferring of the ore slurry to a High Pressure Acid Leach equipment equipped with the following means (a) to (c), for leaching nickel and cobalt; and a solid-liquid separation step of the leached slurry; and is characterized in that, in a trouble of the steps other than the above leaching step, the leached slurry, discharged from the means (c), which is used in the above High Pressure Acid Leach equipment, is subjected to self-circulation inside the High Pressure Acid Leach equipment, by shutdown of transfer to the above solid-liquid separation step, and transferring to the means (a), which is used in the above High Pressure Acid Leach equipment, as well as by shutdown of receiving the above ore slurry and the addition of sulfuric acid, in the above leaching step:

means (a) to preliminarily increase temperature and pressure of the ore slurry;

means (b) to form the leached slurry, by the addition of sulfuric acid to the ore slurry with preliminarily increased temperature and pressure, and leaching under blow of high-pressure steam and high-pressure air;

means (c) to adjust a pressurized state of the leached slurry formed.

In the hydrometallurgical Process for a nickel oxide ore of the present invention, it is important that, in a trouble of the steps other than the above leaching step, the above leached slurry is subjected to self-circulation inside the High Pressure Acid Leach equipment. In order to attain this, in the above leaching step, the leached slurry, discharged from the means (c), which is used in the above High Pressure Acid Leach equipment, is transferring to the means (a), which is used in the above High Pressure Acid Leach equipment, by shutdown of transfer to the above solid-liquid separation step, as well as by shutdown of receiving the above ore slurry and the addition of sulfuric acid. That is, by self-circulation of the above leached slurry inside the above High Pressure Acid Leach equipment, high-temperature and high-pressure conditions near a normal operation can be held inside the High Pressure Acid Leach equipment, in particular, in the means (b), therefore, operation can be started-up by switching to the ore slurry soon, if necessary, and high operation efficiency can be maintained. In addition, different from a conventional shutdown, switching to industrial water is not necessary, and thus discharged water is not generated, which contribute to enhancement of operation efficiency.

The hydrometallurgical Process for a nickel oxide ore using the High Pressure Acid Leach relevant to the hydrometallurgical Process for of the present invention, is one including a preparation step of ore slurry by making a slurry of a nickel oxide ore; a leaching step for obtaining leached slurry by transferring of the ore slurry to the High Pressure Acid Leach equipment equipped with the following means (a) to (c), for leaching nickel and cobalt; and a solid-liquid separation step of the leached slurry, and the total process steps are those shown, for example, in FIG. 1.

FIG. 1 is a process chart representing one example of an embodiment of a hydrometallurgical Process for a nickel oxide ore, in a normal state, according to a High Pressure Acid Leach.

In FIG. 1, a nickel oxide ore 6 is firstly subjected to an ore slurry preparation step 1, to prepare ore slurry 7 including predetermined ore particle size and slurry concentration, and subsequently, in a leaching step 2, subjected to High Pressure Acid Leach using sulfuric acid to form a leached slurry 8. Next, the leached slurry 8 is subjected to the solid-liquid separation step 3, and after multistage washings, is separated to a leach solution 9 containing nickel and cobalt, and a leaching residue 10. The leach solution 9 is subjected to a neutralization step 4 to form a neutralized precipitate slurry 11 containing trivalent iron hydroxide and a pregnant solution for nickel recovery 12. Lastly, the pregnant solution for nickel recovery 12 is subjected to a sulfurization step 5, and is separated to a sulfide 13 containing nickel and cobalt and a barren solution 14 removed the nickel or the like. Here, the neutralized precipitate slurry 11 and the barren solution 14 are circulated to the solid-liquid separation step 3, if necessary. Still more, prior to the solid-liquid separation step 3, a step for preliminary neutralization of free sulfuric acid in the leached slurry 8 (a preliminary neutralization step), not shown in the drawing, may be provided with.

Here, in a trouble of the steps other than the above leaching step 2 (for example, the ore slurry preparation step 1, the solid-liquid separation step 3, the neutralization step 4, the sulfurization step 5 or the preliminary neutralization step), the leached slurry 8 discharged from an apparatus at the exit side of the High Pressure Acid Leach equipment, which configures the leaching step 2, is subjected to self-circulation inside the High Pressure Acid Leach equipment, by shutdown of transfer to the solid-liquid separation step 3 or the preliminary neutralization step, and transferring to an apparatus at the entrance side of the High Pressure Acid Leach equipment, as well as by shutdown of receiving the above ore slurry 7 and the addition of sulfuric acid, in the leaching step 2.

The above nickel oxide ore is not specially limited one but so-called a lateritic ore such as mainly limonite and saprolite. Nickel content in the above lateritic ore is usually 0.8 to 2.5% by weight, and nickel is contained as a hydroxide or a silicic bittern (magnesium silicate) mineral. In addition, iron content is 10 to 50% by weight, and iron is contained mainly as a trivalent hydroxide (goethite) form, however, divalent iron is partially contained in the silicic bittern mineral.

The leaching step for obtaining the above leached slurry, that is, a leaching reaction in a normal state of the leaching step, for example, is performed by the leach reaction represented by the following formulae (1) to (3), and the high-temperature hydrolysis represented by the following formulae (4) and (5).

[Leach Reaction]
Formula (1):

$$MO+H_2SO_4 \rightarrow MSO_4+H_2O \quad (1)$$

(wherein M represents Ni, Co, Fe, Zn, Cu, Mg, Cr, Mn or the like.)

Formula (2):

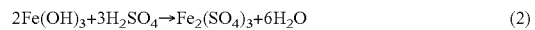
$$2Fe(OH)_3+3H_2SO_4 \rightarrow Fe_2(SO_4)_3+6H_2O \quad (2)$$

Formula (3):

$$FeO+H_2SO_4 \rightarrow FeSO_4+H_2O \quad (3)$$

[High-Temperature Thermal Hydrolysis]
Formula (4):

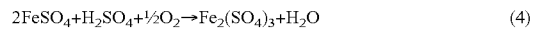
$$2FeSO_4+H_2SO_4+\tfrac{1}{2}O_2 \rightarrow Fe_2(SO_4)_3+H_2O \quad (4)$$

Formula (5):

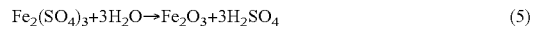
$$Fe_2(SO_4)_3+3H_2O \rightarrow Fe_2O_3+3H_2SO_4 \quad (5)$$

Temperature in the above leaching step, in a normal state, is 220 to 280° C., and preferably 240 to 270° C. That is, iron is fixed as hematite mostly, by performance of the reaction in this temperature range. In the temperature below 220° C., iron dissolves and remains in the reaction solution, due to low rate of the high-temperature thermal hydrolysis, resulting in increase in the solution purification load for removing the iron, which makes it very difficult to separate the iron from nickel. On the other hand, the temperature over 280° C. is not suitable, because not only selection of a material of a reactor to be used for High Pressure Acid Leach is difficult but also steam cost for raising temperature increases, although the high-temperature thermal hydrolysis itself is promoted.

Slurry concentration in the above leaching step, in a normal state, is not especially limited, however, it is preferable that slurry concentration of the leached slurry is adjusted at about 30 to 45% by mass. That is, the leached slurry concentration lower than 30% by mass requires a large equipment to obtain the same residence time in leaching, and also the addition amount of an acid increases to adjust the residual acid concentration. In addition, the resulting leach solution has lower nickel concentration. On the other hand, the slurry concentration over 45% by mass raises a problem of difficult transfer (frequent pipe clogging, high energy requirement etc.) of high concentration slurry, although it allows smaller facility scale.

The addition amount of sulfuric acid in the above leaching step, in a normal state, is not especially limited, and an excess amount is used so as to leach iron in a nickel oxide ore, for example, the amount of 250 to 400 kg per ton of the ore. The addition amount of sulfuric acid over 400 kg, per one ton of the ore, is not preferable, due to increased cost of the sulfuric acid.

The High Pressure Acid Leach equipment to be used in the hydrometallurgical Process for of the present invention, is composed of means of the above (a) to (c), and means of the above (a) to (c) are not especially limited, however, it is preferable to use the following apparatus, respectively:

means of (a): a multistage heater for increasing temperature and pressure of the ore slurry stepwise, means of (b): an autoclave for leaching the ore slurry at high temperature under high pressure, and forming the leached slurry with high temperature and high pressure, and means of (c): a multistage flash tank for decreasing temperature and pressure of the leached slurry stepwise.

Here, self-circulation of the leached slurry inside the High Pressure Acid Leach equipment is performed by utilization of a valve on a pipeline to connect the flash tank and the preliminary neutralization step or the solid-liquid separation step, and by installment of a pipeline for self-circulation to connect the valve and the above heater.

In the hydrometallurgical Process for of the present invention, pH of the relevant leached slurry, in self-circulation of the leached slurry inside the High Pressure Acid Leach equipment, is not especially limited, however, it is preferable to be adjusted at 3.0 to 5.0, and more preferably 4.0 to 5.0. That is, the pH below 3.0 provides low suppression effect of corrosion of the apparatus. On the other hand, the pH over 5.0 is not preferable due to increase in use amount of industrial water, that is, also discharged water amount.

In the hydrometallurgical Process for of the present invention, temperature of the means (b), which composes the relevant High Pressure Acid Leach equipment, in self-circulation of the leached slurry inside the High Pressure Acid Leach equipment, is preferably set at 200 to 260° C., and more preferably 220 to 240° C. That is, it is most desirable to maintain temperature of the above normal state, however, the temperature below 200° C. decreases shortening effect of heat-up time in re-startup. On the other hand, the temperature over 260° C. may require temperature decrease, and thus provides useless consumption of high-pressure steam. It should be noted that it is enough to continuously supply and adjust steam to the autoclave in order to maintain and control temperature.

The hydrometallurgical Process for of the present invention can be applied in a trouble of the steps other than the above leaching step for obtaining the above leached slurry, however, it is preferable to determine in what a state the High Pressure Acid Leach equipment shall wait, by judgment of which method is most suitable in view of operation efficiency, among a countermeasure method for self-circulation of the leached slurry of the present invention in the High Pressure Acid Leach equipment, corresponding to decision of estimated shutdown time in the leaching step accompanying with the relevant trouble; or a conventional method, that is a method for cooling by supplying industrial water instead of the ore slurry, in a connected state of each of the apparatuses; or a countermeasure method for cooling individually by separation of each of the apparatuses. In this way, in a practical operation, in the case of trouble generation in the above other steps, countermeasure is possible, based on judgment standards, for example, shown in Table 1, corresponding to estimated shutdown time of the above leaching step, based on restoration time of each of the troubles in normal operation.

TABLE 1

| Estimated shutdown time | Countermeasure method | Basis of judgment standards* |
| --- | --- | --- |
| The case within 12 hours | Self-circulation of the present invention | Cooling time: 2 to 3 hours Heating time: 1 to 2 hours Generated waste solution (volume): ≤600 m$^3$ |

TABLE 1-continued

| Estimated shutdown time | Countermeasure method | Basis of judgment standards* |
| --- | --- | --- |
| The case over 12 hours | Conventional method | Cooling time: 6 to 8 hours Heating time: 4 to 6 hours Generated waste solution (volume): ≥2000 m$^3$ |

*Required values for each of the countermeasure methods.

In Table 1, the above estimated shutdown time as a judgment standard of a countermeasure, is 12 hours. That is, a method for self-circulation of the leached slurry of the present invention in the High Pressure Acid Leach equipment is applicable preferably in the case where the above estimated shutdown time is within 12 hours. Here, reason for setting the above estimated shutdown time, as a standard, to be within 12 hours is because it requires usually about 6 to 8 hours to decrease temperature down to 150 to 180° C., and about 4 to 6 hours to increase temperature again, that is about 12 hours in total, in average, in the case where the High Pressure Acid Leach equipment is shutdown and temperature is decreased by separation of each of the apparatuses, and then temperature is increased again. That is, in the case where restoration time of troubles is over 12 hours, it is sufficient to respond to them by a conventional method. It should be noted that, in the case where restoration time of troubles is over 24 hours, a countermeasure by further decreasing temperature may be taken, in consideration of cost of steam to be consumed in warming the autoclave.

It should be noted that 12 hours is taken as a guideline, in the judgment standard in Table 1, however, this is based on a time required from shutdown to start-up by a conventional countermeasure method, and thus in the case where this required time varies, the standard time may be adjusted and varied, as appropriate.

EXAMPLES

Explanation will be given below in further detail on the present invention with reference to Example and Comparative Example of the present invention, however, the present invention should not be limited to these Examples.

Example 1

In the hydrometallurgical Process for a nickel oxide ore using the High Pressure Acid Leach, which process is shown in FIG. 1, countermeasures was prepared to take that, in the case of generation of a trouble of the steps other than the above leaching step, the leached slurry discharged from a three-stage flash tank, which configures the above High Pressure Acid Leach equipment of the leaching step, is subjected to self-circulation inside the High Pressure Acid Leach equipment, by transferring to the entrance side of a three-stage heater, which configures the above High Pressure Acid Leach equipment, as well as by shutdown of receiving the ore slurry and the addition of sulfuric acid to the autoclave, in the above leaching step. It should be noted that pH of the leached slurry to be self-circulated was controlled at 3.7, and temperature inside the autoclave at 220° C.

After one-year of operation performance (from January to December, 2007), the number of troubles generated during the relevant period was 6 times, however, a trouble giving estimated shutdown time of the High Pressure Acid Leach equipment over 12 hours was only once. As a result, shutdown of the High Pressure Acid Leach equipment was also only once (8 hours). Results are shown in Table 2.

It should be noted that troubles caused by corrosion of a supply pump to the heater, mechanical seal apparatus and the like, were not observed.

Comparative Example 1

In the hydrometallurgical Process for a nickel oxide ore using the High Pressure Acid Leach, which process is shown in FIG. 1, in the case of generation of a trouble of the steps other than the above leaching step, countermeasure was taken by either of a method for cooling, by supplying industrial water instead of the ore slurry, while each of the apparatuses are connected; or a method for cooling individually, by separation of each of the apparatuses.

After one-year of operation performance (from January to December, 2006), the number of troubles generated during the relevant period was 7 times, and the High Pressure Acid Leach equipment was shutdown each time. Results are shown in Table 2.

TABLE 2

| | Shutdown frequency | Shutdown time | Generated waste solution (volume) |
| --- | --- | --- | --- |
| Example 1 | once/y | 8 hours/y | 500 m$^3$/y |
| Com. Example 1 | 7 times/y | 336 hours/y | about 15,000 m$^3$/y |

From Table 2, it is understood that, in Example 1, because countermeasures was taken, according to a method of the present invention, by self-circulation of the leached slurry inside the High Pressure Acid Leach equipment, in trouble generation, and for a trouble which estimated shutdown time of the High Pressure Acid Leach equipment is within 12 hours, shutdown time of the High Pressure Acid Leach equipment for one year, and discharged water amount generated are improved to a large extent, as compared with Comparative Example 1 representing a conventional method. That is, in Example 1, shutdown time of the High Pressure Acid Leach equipment for one year becomes equal to 1/40 or lower, as well as discharged water amount generated becomes about 1/30, showing that high operation efficiency can be maintained as a whole operation basis.

As is clear from the above, the hydrometallurgical Process for a nickel oxide ore of the present invention, is suitable as a method for maintaining operation efficiency in trouble generation, in a hydrometallurgical Process for a nickel oxide ore using a High Pressure Acid Leach, because it is capable of preventing inevitable operation shutdown of the above leaching step, and maintaining high operation efficiency as a whole process basis, in a trouble of the steps other than the leaching step.

What is claimed is:

1. A method for shortening operation shutdown time of high pressure acid leach equipment in a hydrometallurgical process, wherein the high pressure acid leach equipment comprises
   (i) a first piping, wherein the first piping is used to transfer an ore slurry into the high pressure acid leach equipment;
   (ii) a multistage heater, wherein the multistage heater is used stepwise to increase temperature and pressure of the ore slurry before leaching or a leached slurry;
   (iii) an autoclave, wherein the autoclave is used to add sulfuric acid to the ore slurry with temperature and pressure increased by the multistage heater (ii) and to leach the ore slurry to obtain a leached slurry at high temperature under high pressure;
   (iv) a multistage flash tank to adjust the pressure of the leached slurry;
   (v) a second piping, wherein the second piping is used to discharge the leached slurry from the high pressure acid leach equipment; and
   (vi) a piping for self-circulation, wherein the piping for self-circulation is used to discharge the leached slurry from the multistage flash tank (iv) to transfer the leached slurry to the multistage heater (ii);
   wherein, in case of operation shutdown of the high pressure acid leach equipment, the leached slurry is subjected to self-circulation inside the high pressure acid leach equipment by transferring the leached slurry from the autoclave (iii) through the multistage flash tank (iv) and the piping for self-circulation (vi) to the multistage heater (ii), so that the high temperature and high pressure atmosphere of the autoclave (iii) is held.

2. The method according to claim 1, wherein the self-circulation of the leach slurry is achieved by:
   shutdown of the transfer of the ore slurry through the first piping (i),
   shutdown of the addition of sulfuric acid autoclave (iii), and
   shutdown of the discharge of the leached slurry in the second piping (v); and
   discharging the leached slurry from the multistage flash tank (iv) to transfer the leached slurry through the piping for self-circulation (vi) to the multistage heater (ii).

3. The method according to claim 1, wherein the pH of the leached slurry inside the high pressure acid leach equipment is adjusted at 3.0 to 5.0.

4. The method according to claim 1, wherein the temperature of the autoclave (iii) is 200 to 260° C.

5. The method according to claim 1, wherein the operation shutdown time is within 12 hours.

6. The method according to claim 2, wherein the pH of the leached slurry inside the high pressure acid leach equipment is adjusted at 3.0 to 5.0.

7. The method according to claim 2, wherein the operation shutdown time is within 12 hours.

* * * * *